(12) United States Patent
Aigner et al.

(10) Patent No.: US 9,825,944 B2
(45) Date of Patent: Nov. 21, 2017

(54) SECURE CRYPTOPROCESSOR FOR AUTHORIZING CONNECTED DEVICE REQUESTS

(71) Applicant: Microsoft Technology Licensing, LLC, Redmond, WA (US)

(72) Inventors: Ronald Aigner, Redmond, WA (US); Kevin Kane, Bellevue, WA (US); Stefan Thom, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 14/163,220

(22) Filed: Jan. 24, 2014

(65) Prior Publication Data
US 2015/0215309 A1  Jul. 30, 2015

(51) Int. Cl.
| | |
|---|---|
| *H04L 29/06* | (2006.01) |
| *H04L 9/32* | (2006.01) |
| *G06F 21/00* | (2013.01) |
| *G06F 7/04* | (2006.01) |
| *G06F 21/34* | (2013.01) |
| *G06F 21/35* | (2013.01) |

(Continued)

(52) U.S. Cl.
CPC ........ *H04L 63/0853* (2013.01); *G06F 9/5033* (2013.01); *G06F 21/34* (2013.01); *G06F 21/35* (2013.01); *H04L 63/0823* (2013.01); *H04L 63/0884* (2013.01); *H04L 63/10* (2013.01); *H04W 12/08* (2013.01)

(58) Field of Classification Search
CPC . H04L 63/0853; H04L 63/0884; H04L 63/10; H04L 63/0823; H04W 12/08; G06F 9/5033; G06F 21/34; G06F 21/35

USPC .................. 726/4, 7, 26; 713/166, 168, 182
See application file for complete search history.

(56) References Cited

U.S. PATENT DOCUMENTS

| | | |
|---|---|---|
| 4,712,103 A | 12/1987 | Gotanda |
| 7,364,087 B2 | 4/2008 | Zimmer et al. |

(Continued)

FOREIGN PATENT DOCUMENTS

| | | |
|---|---|---|
| EP | 1139200 | 10/2001 |
| EP | 2560341 | 2/2013 |

OTHER PUBLICATIONS

Bleikertz, et al., "Client-Controlled Cryptography-as-a-Service in the Cloud", In Proceedings of the 11th International Conference on Applied Cryptography and Network Security, 2013, pp. 19-39.

(Continued)

*Primary Examiner* — Aravind Moorthy
(74) *Attorney, Agent, or Firm* — Workman Nydegger

(57) ABSTRACT

A computing device described herein utilizes a secure cryptoprocessor of the computing device to compute a response to a request for authorization received from another local or remote device. The secure cryptoprocessor computes the response based on protected authorization credentials stored by the secure cryptoprocessor for one or more devices. The computing device then provides the computed response to the other device to cause the other device to grant or deny authorization. The computing device may also display information associated with the request for authorization, receive input indicating approval of the request, and utilize the secure cryptoprocessor in response to the received input.

22 Claims, 6 Drawing Sheets

(51) Int. Cl.
*G06F 9/50* (2006.01)
*H04W 12/08* (2009.01)

(56) References Cited

U.S. PATENT DOCUMENTS

| | | | |
|---|---|---|---|
| 8,805,746 B2 | 8/2014 | Hoffman et al. | |
| 8,811,895 B2 | 8/2014 | Reisgies et al. | |
| 2006/0229014 A1* | 10/2006 | Harada et al. | 455/41.2 |
| 2007/0118891 A1 | 5/2007 | Buer | |
| 2008/0134309 A1* | 6/2008 | Qin et al. | 726/6 |
| 2009/0292919 A1* | 11/2009 | England | 713/168 |
| 2010/0212008 A1* | 8/2010 | Jaganathan | G06F 21/6218 726/19 |
| 2010/0257596 A1* | 10/2010 | Ngo | G06F 21/6218 726/7 |
| 2010/0332830 A1* | 12/2010 | Shon et al. | 713/168 |
| 2011/0078081 A1 | 3/2011 | Pirzadeh et al. | |
| 2012/0172026 A1 | 7/2012 | Kwon et al. | |
| 2013/0145440 A1* | 6/2013 | Adam | G06F 21/40 726/5 |
| 2013/0262556 A1 | 10/2013 | Xu et al. | |
| 2013/0324169 A1* | 12/2013 | Kamal et al. | 455/466 |
| 2014/0059651 A1* | 2/2014 | Luster | G06F 21/604 726/4 |
| 2014/0127994 A1* | 5/2014 | Nightingale et al. | 455/41.1 |
| 2014/0208394 A1* | 7/2014 | Goodwin | 726/4 |
| 2014/0222688 A1* | 8/2014 | Haggerty et al. | 705/71 |
| 2014/0310510 A1* | 10/2014 | Potlapally | G06F 11/1446 713/2 |
| 2015/0044964 A1* | 2/2015 | Khan et al. | 455/41.1 |
| 2015/0074764 A1* | 3/2015 | Stern | 726/4 |
| 2015/0081552 A1* | 3/2015 | Stewart | G06Q 20/40145 705/44 |
| 2015/0143543 A1* | 5/2015 | Phegade | H04W 12/06 726/29 |

OTHER PUBLICATIONS

Rahman, "How Do Servers Locate a Domain Controller in a Network", Retrieved on: Aug. 25, 2015, Available at: http://blogs.msdn.com/b/servergeeks/archive/2014/07/05/how-do-servers-locate-a-domain-controller-in-a-network.aspx.

"Anonymous: Jack Ryan: Shadow Recruit (2014)—Release Info—IMDb", Retrieved on: May 18, 2015 Available at: http://www.imdb.com/title/tt1205537/releaseinfo?ref_=tt_dt_dt.

"Paramount: Jack Ryan Shadow Recruit", Retrieved on: May 19, 2015, Available at: https://www.youtube.com/watch?v=boz3qSSOKxY.

Search Report & Written Opinion dated Sep. 1, 2015 in PCT Application No. PCT/US2015/011365.

"How Domain Controllers are Located in Windows XP", Retrieved on: Nov. 20, 2009, Available at: http://outwardtruth.com/pdf/How%20Domain%20Controllers%20Are%20Located%20in%20Windows%20XP.pdf.

"Anonymous: How Domain Controllers are Located in Windows", Retrieved on: Aug. 25, 2015, Available at: https://support.microsoft.com/en-us/kb/247811.

* cited by examiner

SECURE CRYPTOPROCESSOR FOR AUTHORIZING CONNECTED DEVICE REQUESTS

BACKGROUND

To compensate for the well-known shortcomings of passwords, two-factor authentication adds the possession of a physical token as a requirement. For example, "smart cards" that have small, secure cryptographic capabilities are a common physical token used by enterprises for authenticating identities and authorizing requests. Unfortunately, issuing smart cards can be costly and require a user to hold multiple cards for multiple purposes. Users have a bad habit of forgetting their cards in card readers, and systems accepting a smart card need additional hardware to read them. In remoting scenarios, an unprivileged user may need additional authorization from an administrator to perform a privileged action, but this may require the administrator to reveal his or her credentials to the user.

To avoid the difficulties surrounding smart cards, Bluetooth devices with security credentials have been used in place of smart cards. These Bluetooth devices lack adequate protections for security credentials, however, so smart cards remain the overwhelming choice for two-factor authentication.

SUMMARY

Rather than utilizing a smart card, authorization may be provided by a secure cryptoprocessor of an additional device, which may be local to or remote from the device seeking the authorization. The authorization may authenticate an identity of a user at the requesting device or authorize an action that the requesting device seeks to perform. The additional device may receive a request for the authorization, utilize its secure cryptoprocessor to compute a response to the request, and provide the computed response to the requesting device. The secure cryptoprocessor may compute the response based at least in part on protected authorization credentials stored by the secure cryptoprocessor for one or more devices. The additional device may also display information associated with the request to a user to obtain the user's assent to the request.

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, an authorizing device equipped with a secure cryptoprocessor that the authorizing device utilizes to compute a response to a request for authorization received from another local or remote device ("the requesting device"). As used herein, "request for authorization" refers to both a request to authenticate an identity of a user at the requesting device and a request to authorize an action that the requesting device seeks to perform. The secure cryptoprocessor computes the response based on protected authorization credentials stored by the secure cryptoprocessor for one or more devices. The authorizing device then provides the computed response to the requesting device to cause the requesting device to grant or deny authorization. The authorizing device may also display information associated with the request for authorization, receive input indicating approval of the request, and utilize the secure cryptoprocessor in response to the received input.

The disclosure also describes a requesting device configured to request authorization from a local or remote authorizing device. In response to receiving a request from an application or a platform of the requesting device, the requesting device may identify the authorizing device from a certificate or from a directory entry. The request may, for example, be by a logon or elevation request, and such a certificate may have been previously received from a wireless broadcast by the authorizing device or may have been received from another source. The requesting device then provides an authorization request to the identified authorizing device and receives a response to that request computed by a secure cryptoprocessor of the authorizing device. The requesting device then grants or denies the request received from the application or platform of the requesting device based at least in part on the computed response.

Example Environments

Figure 1:
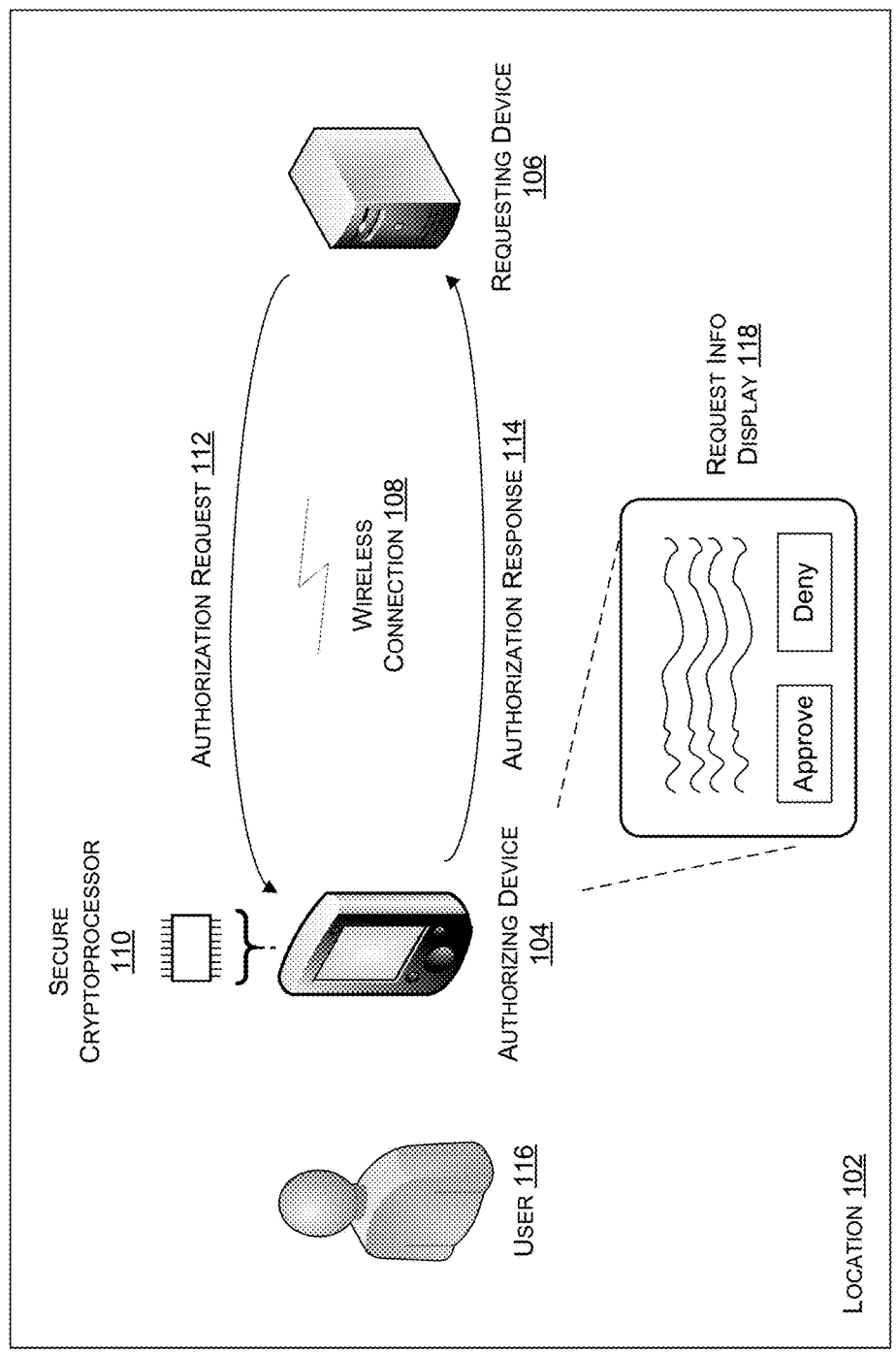
FIG. 1 illustrates an environment including requesting and authorizing devices which are local to each other, the authorizing device utilizing its secure cryptoprocessor to compute a response to an authorization request from the requesting device.

FIG. 1 illustrates an environment including requesting and authorizing devices which are local to each other, the authorizing device utilizing its secure cryptoprocessor to compute a response to an authorization request from the requesting device. As illustrated at a location 102, an authorizing device 104 may be in proximity to a requesting device 106 and may communicate with the requesting device 106 over a wireless connection 108. The authorizing device 104 may have a secure cryptoprocessor 110 which the authorizing device 104 may utilize responsive to receiving an authorization request 112 from the requesting device 106. The secure cryptoprocessor 110 may compute an authorization response 114 to the authorization request 112, and the authorizing device 104 may provide the authorization response 114 to the requesting device 106. In some embodiments, the authorizing device 104 may display to a user 116 a user interface 118 with information associated with the authorization request 112 to seek the assent of the user 116 to the authorization request 112.

Figure 3:
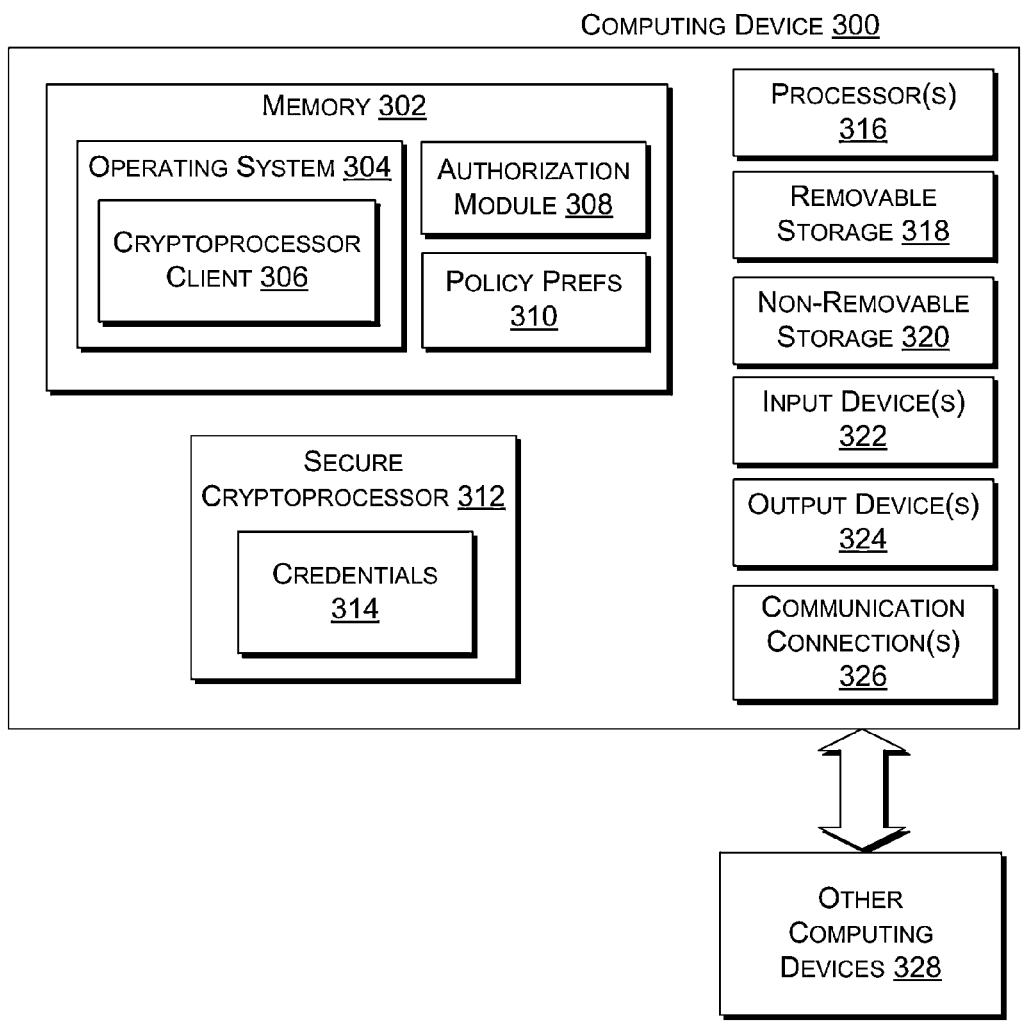
FIG. 3 illustrates an example computing device that includes a secure cryptoprocessor with protected authorization credentials for authorizing requests for one or more requesting devices.
Figure 4:
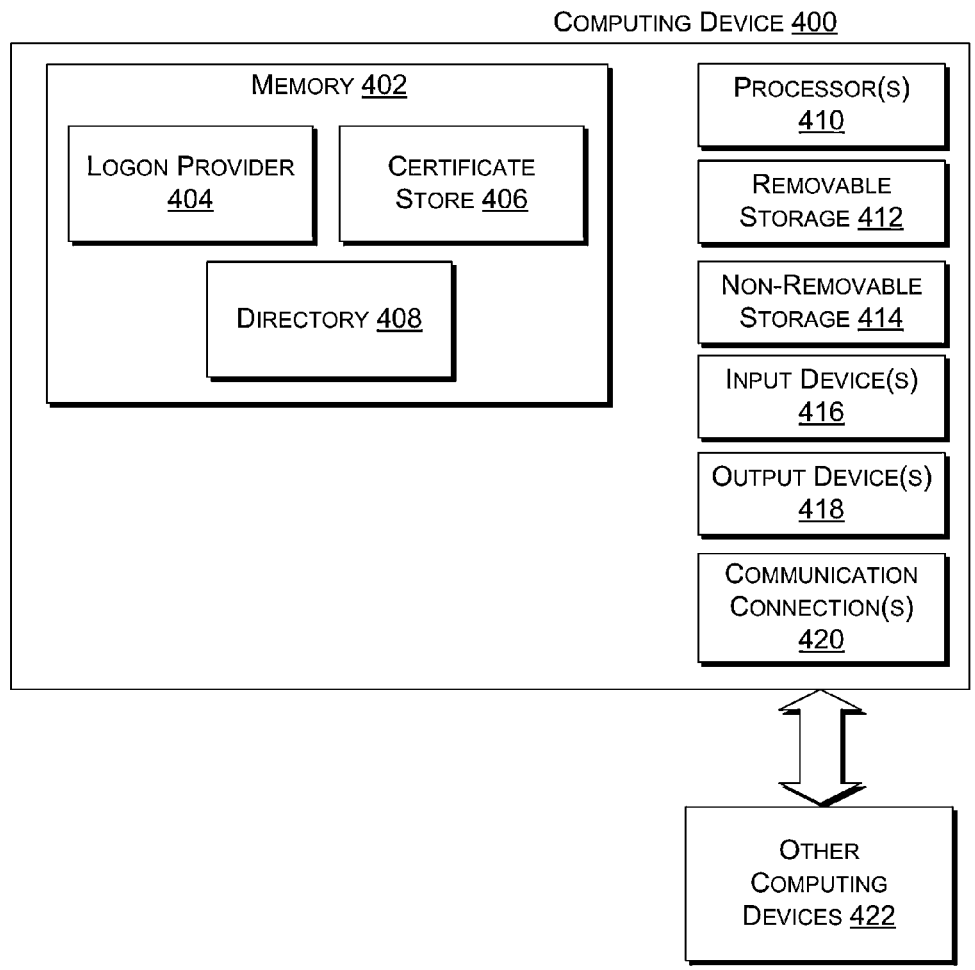
FIG. 4 illustrates an example computing device that includes modules and data enabling the example computing device to request authorization from another computing device.

The authorizing device 104 and requesting device 106 may each be implemented as any sort of computing device, such as a personal computer (PC), a laptop computer, a work station, a server system, a mainframe, a cellular phone, a smart phone, a tablet computer, a media center, a media device, a game console, a calculator, an e-reader, a badge reader, an appliance, a vehicle, or a wearable computing device. Also, modules and data of the each of the authorizing device 104 and requesting device 106 may be implemented in a single computing device or distributed among multiple computing devices. In some embodiments, one or more of the authorizing device 104 and requesting device 106 may be implemented as a virtual machine on a computing device. An example authoring device 104 is illustrated in FIG. 3 and described below in detail with respect to that figure. An example requesting device 106 is illustrated in FIG. 4 and described below in detail with respect to that figure.

The wireless connection 108 may be any sort of wireless connection, such as a Bluetooth® connection, a WiFi connection, or a Near Field Communication (NFC) connection over any public or private wireless network(s). Such network(s) may be local area networks (LAN), personal area networks (PAN), or some combination of both. The wireless connection 108 may, as described, be between proximate devices at a single location 102. What is considered "proximate" or a "location" may vary from embodiment to embodiment. Transmission of the authorization request 112 and authorization response 114 over the wireless connection 108 may be encrypted or unencrypted.

In various embodiments, the requesting device 106 may send a request for authorization 112 to the authorizing device 104 for any of a number of reasons. For example, a user may be seeking to logon to the requesting device 106 or to elevate his or her permissions in order to access some service or feature of the requesting device 106. Alternatively, the requesting device 106 could be a badge reader issuing a challenge to user 116 that seeks to enter premises protected by the badge reader. In other examples, the requesting device 106 could be a computing device seeking authorization for some action, such as purchasing media content, making some other purchase, initiating communication with a third party, providing access to a vehicle or garage, or rewarding points associated with a loyalty card or loyalty account. In yet another example, the requesting device 106 may seek to authenticate an identity (e.g., to ensure that a user presenting a plane ticket is who the user claims to be). Any number of other purposes, such as purposes for which a smart card may be used, may be the reason that authorization is sought.

The authorization request 112 may be formed and transmitted by any application or operating system component of the requesting device 106. For example, if a user of the requesting device 106 makes a logon or elevation request, a logon provider of the operating system may formulate the authorization request 112 or invoke another application or component to formulate the authorization request 112. Prior to sending the authorization request 112, the requesting device 106 determines which authorizing device 104 to send the authorization request 112 to. To make identify the authorizing device 104, the requesting device 106 may consult either a certificate store or active directory of the requesting device 106, or may consult an enterprise directory stored remotely, locally, or partly locally and partly remotely. A certificate or directory entry (e.g., one pointed to by a username entered in a logon or elevation request) may include a list of one or more authorizing devices 104, which may be a prioritized list. If the list is prioritized, the requesting device 106 may wirelessly connect to the highest priority authorizing device 104 that is in proximity to the requesting device 106. In other embodiments, the requesting device 106 may also consider remotely accessible authorizing devices 104, as described below with reference to FIG. 2. In other examples, such as when the requesting device 106 is a badge reader, the requesting device 106 may recognize the proximity of an authorizing device 104 and automatically respond with an authorization request 112.

In some embodiments, the requesting device 106 may have previously received the certificate and stored the certificate in its certificate store. Such a certificate may have been wirelessly broadcast by the authorizing device 104. Alternatively or additionally, the directory of the requesting device 106 may have been previously populated by a remote service.

The authorization request 112 is then communicated by the application or component of the requesting device 106 over the wireless connection 108 to the identified and selected authorizing device 104. Upon receiving the authorization request 112, an authorization module of the authorizing device 104 may process the authorization request 112. The authorization module of the authorizing device 104 may examine the authorization request 112 and determine whether to display information associated with the authorization request 112 to a user interface 118 of the authorizing device 104. The authorization module may display information to the user interface 118 for all authorization requests 112, for authorization requests 112 from certain requesting devices 106 or categories of requesting devices 106, or for specific authorization requests 112, based on one or both of policy preferences stored by the authorizing device 104 or contents of the authorization request 112.

In some embodiments, the authorization module of the authorizing device 104 displays to the user interface 118 information indicating the authorization sought (e.g., "ok to purchase for $10"), an identity of the requesting device 106 or of a user of the requesting device 106, or both, along with selectable options to assent to or decline the authorization request 112. The authorization module may also display one or more selectable conditions (e.g., no viewing content on channel 13) to place on the authorization or fields for entering such conditions. Alternatively or additionally, the authorization module may display on the user interface 118 one or more questions (e.g., "are you ok with your child viewing content on channel 13?") which may result in conditions being placed on the authorization. The information displayed, the conditions presented, or the questions asked may be determined by the authorization module based on a policy including in the authorization request 112.

In further embodiments, the authorization request 112 may include a photo captured at the requesting device 106, such as a photo of the user of the requesting device 106. The authorization module of the authorizing device 104 may display the photo to the user interface 118 to enable the user 116 to assent to or deny the authorization request 112 based at least in part on the photo.

In some embodiments, the authorization request 112 may include a location of the requesting device 106. While the user 116 may think that the authorization request 112 comes from a device that the user 116 and authorizing device 104 are proximate to, that device may simply be serving as a communication relay for a remote requesting device 106. The authorization module of the authorizing device 104 may display the location to the user interface 118 to enable the user 116 to assent to or deny the authorization request 112 based at least in part on the location of the requesting device 106.

In various embodiments the authorization module may also determine whether to request the user 116 to enter a personal identification number (PIN) to verify that the user 116 is the person who should be assenting to or denying the authorization request 112. The authorization module may determine whether to request PIN entry based on the content of the authorization request 112, based on policy preferences stored by the authorizing device 104, or based on whether the requesting device 106 is a trusted machine. The authorization module may request and receive the PIN through the user interface 118 of the authorizing device 104 or through any other input and output mechanisms. In other or additional embodiments, the authorization module may request a biometric in addition to or instead of a PIN.

If the user 116 declines the authorization request 112, the authorization module may simply prepare and provide an authorization response 114 which indicates that the authorization request 112 has been declined. If the user 116 assents to the authorization request 112, then the authorization module may invoke the secure cryptoprocessor 110 of the authorizing device 104. The authorization module may invoke the secure cryptoprocessor 110 through a cryptoprocessor client of an operating system of the authorizing device 104.

In various embodiments, the secure cryptoprocessor 110 may be any sort of security processor, such as a trusted platform module (TPM). Such a TPM may be either a hardware or firmware/software TPM and may store protected authorization credentials, such as private keys, for one or more requesting devices. When utilized to compute an authorization response 114 to the authorization request 112 of the requesting device 106, the secure cryptoprocessor 110 may identify the protected authorization credentials for the requesting device 106 and utilize those credentials to compute the authorization response 114 by, for instance, signing the authorization response with the credentials. If a PIN has been requested and entered, the secure cryptoprocessor 110 may also utilize the PIN in computing the authorization response 114.

In some embodiments, the secure cryptoprocessor 110 may include pointers or links to one or more cloud secure cryptoprocessors and may utilize the cloud secure cryptoprocessors to compute the authorization response 114. Certain types of authorization requests 112, or requests for certain requesting devices 106 may have their authorization responses 114 computed by the secure cryptoprocessor, while other requests 112 may have their authorization responses 114 computed by the cloud secure cryptoprocessors. For example, requests 112 associated with less critical security credentials may have responses 114 computed by the secure cryptoprocessor 110 while requests associated with critical security credentials may have responses 114 computed by the cloud secure cryptoprocessors.

After the secure cryptoprocessor 110 has computed the authorization response 114, the authorization module of the authorizing device 104 may provide the authorization response 114 to the requesting device 106 over the wireless connection 108. In a number of embodiments, the authorization module may include with the computed authorization response 114 one or more conditions placed on the authorization. Such conditions may have been entered, selected, or derived based on the above-described interactions with the user interface 118 or may be retrieved from policy preferences stored by the authorizing device 104.

In some embodiments, the requesting device 106 may then provide the authorization response 114 to an authority (e.g., a domain controller) for verification. If the authority verifies the authorization response 114, then the requesting device 106 may grant the requested authorization and authenticate a user or perform an action, whatever corresponds to the authorization sought. If the authorization response 114 includes one or more conditions on authorization, then the requested authorization may be granted subject to those conditions. In a number of embodiments, the authorization may be conditioned on the continuing proximity of the authorizing device 104 and may expire when the authorizing device 104 leaves the location 102. In further embodiments, the authorization response 114 may include a long, complex password which the requesting device 106 may provide to its logon provider to complete an initiated logon.

In various embodiments, the requesting device 106 may also be an authorizing device with a secure cryptoprocessor and may engage in two-way authorization with the authorizing device 104. Such two-way authorization may involve the authorizing device 104 acting as a requesting device, sending an authorization request to the requesting device 106 contemporaneously with the authorization request 112, and receiving an authorization response computed by the requesting device 106 contemporaneously with the computing and sending of the authorization response 114.

Figure 2:
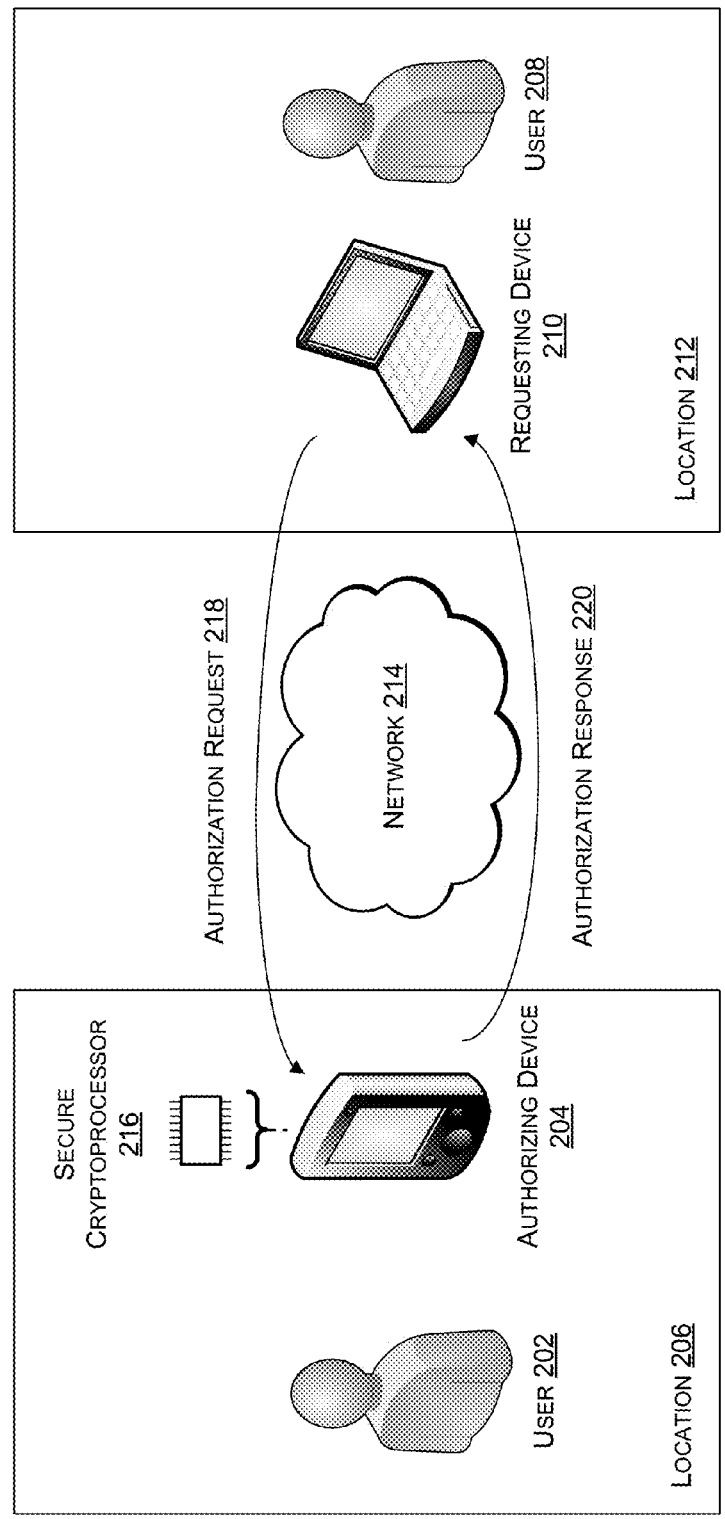
FIG. 2 illustrates an environment including requesting and authorizing devices which are remote from each other, the authorizing device utilizing its secure cryptoprocessor to compute a response to an authorization request from the requesting device.

FIG. 2 illustrates an environment including requesting and authorizing devices which are remote from each other, the authorizing device utilizing its secure cryptoprocessor to compute a response to an authorization request from the requesting device. As illustrated, a user 202 with an authorizing device 204 at a location 206 may communicate with a user 208 having a requesting device 210 at a location 212 over a network 214. The authorizing device 204 has a secure cryptoprocessor 216 which the authorizing device 204 utilizes responsive to receiving an authorization request 218 from the requesting device 210 to compute an authorization response 220. The authorizing device 204 then provides the computed authorization response 220 to the requesting device 210.

The locations 206 and 212 may be any two locations which are different from each other. Such locations 206 and 212 may be outside the range of a wireless connection, such as the wireless connection 208 illustrated in FIG. 1. The authorizing device 204 and requesting device 210 may be the same sorts of devices as the authorizing device 104 and requesting device 106 and may have the same capabilities describes above.

In some embodiments, the user 208 may be seeking to logon to the requesting device 210 or may be seeking elevated privileges to perform some action on the requesting device 210. To complete the logon or gain the elevated privileges, the requesting device 210 may send an authorization request 218 to the remote authorizing device 204 over the network 214. In other embodiments, the user 208 may be a child seeking to make a purchase and needing permission from a parent, who may be the user 202. To make the purchase, the requesting device 210 may send an authorization request 218 to the remote authorizing device 204 over the network 214 and receive an authorization response 220 which grants or denies the purchase request.

The network 214 may be or include a public or private network, such as the Internet, a packet-switched network, a circuit switched network, or combination of packet switched and circuit switched networks. The network 214 may include a plurality of computing devices connected, for example, by one or more wide area networks (WAN), one or more local area networks (LAN), and/or one or more personal area networks (PAN). Communication between these ones of these computing devices of the network 214 may be wired, wireless, or both. These communications may utilize any sort of communication protocol known in the art for sending and receiving messages, such as the Transmission Control Protocol/Internet Protocol (TCP/IP), the Hypertext Transfer Protocol (HTTP), Extensible Messaging and Presence Protocol (XMPP), and/or the Session Initiation Protocol (SIP).

The secure cryptoprocessor 216 may be the same sort of cryptoprocessor as the secure cryptoprocessor 110, which is described above in detail. The authorization request 218 and authorization response 220 may also be the same as the authorization request 112 and authorization response 114, except that the authorization request 218 and authorization response 220 are transmitted over the network 214.

Example Devices

FIG. 3 illustrates an example computing device 300 that includes a secure cryptoprocessor with protected authorization credentials for authorizing requests for one or more requesting devices. Computing device 300 may be an example of an authorizing device 104 or 204. As illustrated, the computing device 300 includes a memory 302 that stores an operating system 304 having a cryptoprocessor client 306, an authorization module 308, and policy preferences 310. The computing device 400 also includes a secure cryptoprocessor 312 storing protected authorization credentials 314, processor(s) 316, removable storage 318, non-removable storage 310, input device(s) 322, and output device(s) 324 and has communication connection(s) 326 with other computing devices 328.

In various embodiments, the memory 302 is volatile (such as RAM), non-volatile (such as ROM, flash memory, etc.) or some combination of the two. As mentioned, the system memory 302 may store an operating system 304 having a cryptoprocessor client 306, an authorization module 308, and policy preferences 310. In addition, the memory 302 may also store other modules and data. Alternatively, any modules of the computing device 300 may be implemented in hardware. For example, the authorization module 308 may be implemented as a hardware component.

In some embodiments, the operating system 304, cryptoprocessor client 306, authorization module 308, policy preferences 310, secure cryptoprocessor 312, and protected authorization credentials 314 may be example of the operating systems, cryptoprocessor clients, authorization modules, policy preferences, secure cryptoprocessors, and protected authorization credentials discussed above with respect to FIGS. 1 and 2.

In some embodiments, the processor(s) 316 is a microprocessing unit (MPU), central processing unit (CPU), a graphics processing unit (GPU), or any other sort of processing unit. Among other capabilities, the processor 316 can be configured to fetch and execute computer-readable processor-accessible instructions stored in memory 302, such as the instructions represented by modules and data 304-310.

Computing device 300 may also include additional data storage devices (removable and/or non-removable) such as, for example, magnetic disks, optical disks, or tape. Such additional storage is illustrated in FIG. 3 by removable storage 318 and non-removable storage 320. Memory 302, removable storage 318 and non-removable storage 320 are all examples of computer storage media. As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media can embody computer-readable instructions, data structures, program modules, or other data in a modulated data signal, such as a carrier wave. As defined herein, computer storage media does not include communication media.

Computing device 300 also has input device(s) 322, such as a keyboard, a mouse, a touch-sensitive display, voice input device, etc., and output device(s) 324 such as a display, speakers, a printer, etc. These devices are well known in the art and need not be discussed at length here.

Computing device 300 also contains communication connections 326 that allow the computing device 300 to communicate with other computing devices 328, such as a requesting device 106, 210, or 400.

FIG. 4 illustrates an example computing device 400 that includes modules and data enabling the example computing device 400 to request authorization from another computing device. Computing device 400 may be an example of a requesting device 106 or 210. As illustrated, the computing device 400 includes a memory 402 that stores a logon provider 404, a certificate store 406, and a directory 408. The computing device 400 also includes processor(s) 410, removable storage 412, non-removable storage 414, input device(s) 416, and output device(s) 418 and has communication connection(s) 420 with other computing devices 422.

In various embodiments, the memory 402 is volatile (such as RAM), non-volatile (such as ROM, flash memory, etc.) or some combination of the two. As mentioned, the system memory 402 may store a logon provider 404, a certificate store 406, and a directory 408. In addition, the memory 402 may also store other modules and data, such as an operating system of the computing device 400. Alternatively, any modules of the computing device 400 may be implemented in hardware. For example, the logon provider 404 may be implemented as a hardware component.

In some embodiments, the logon provider 404 may be an example of a logon provider application discussed above with respect to FIGS. 1 and 2. Likewise, the certificate store 406 and directory 408 may be example of certificates stores and directories discussed above with respect to FIGS. 1 and 2.

In some embodiments, the processor(s) 410 is a microprocessing unit (MPU), central processing unit (CPU), a graphics processing unit (GPU), or any other sort of processing unit. Among other capabilities, the processor 410 can be configured to fetch and execute computer-readable processor-accessible instructions stored in memory 402, such as the instructions represented by modules and data 404-408.

Computing device 400 may also include additional data storage devices (removable and/or non-removable) such as, for example, magnetic disks, optical disks, or tape. Such additional storage is illustrated in FIG. 4 by removable storage 412 and non-removable storage 414. Memory 402, removable storage 412 and non-removable storage 414 are all examples of computer storage media. As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media can embody computer-readable instructions, data structures, program modules, or other data in a modulated data signal, such as a carrier wave. As defined herein, computer storage media does not include communication media.

Computing device 400 also has input device(s) 416, such as a keyboard, a mouse, a touch-sensitive display, voice input device, etc., and output device(s) 418 such as a display, speakers, a printer, etc. These devices are well known in the art and need not be discussed at length here.

Computing device 400 also contains communication connections 420 that allow the computing device 400 to communicate with other computing devices 422, such as an authorizing device 104, 204, or 300.

While example device configurations and architectures have been described, other implementations are not limited to the particular configurations and architectures described herein. Thus, this disclosure can extend to other implementations, as would be known or as would become known to those skilled in the art.

Example Processes

Figure 5:
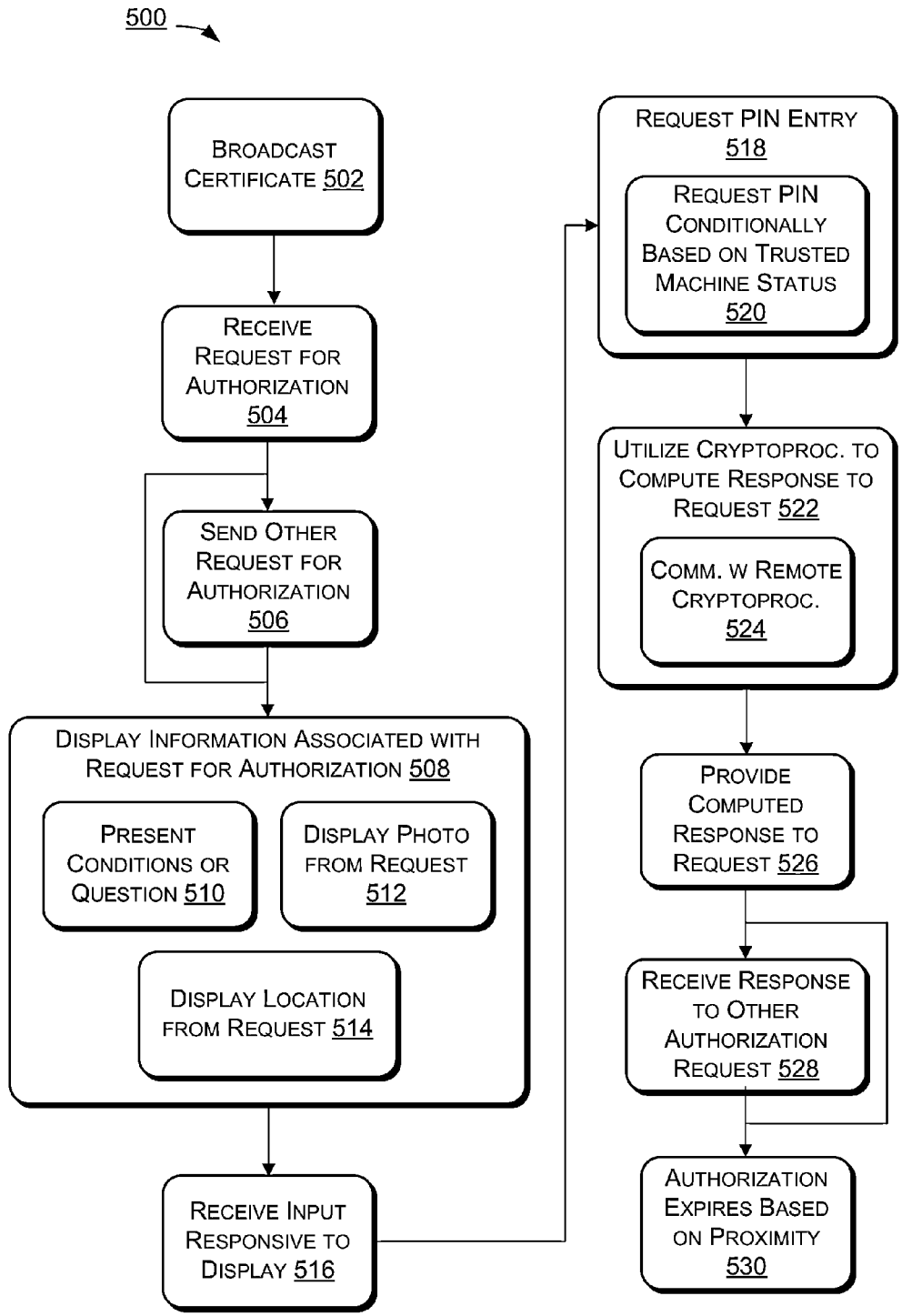
FIG. 5 illustrates an example process for utilizing a secure cryptoprocessor to compute a response to an authorization request received from another device and to provide the response to the other device.
Figure 6:
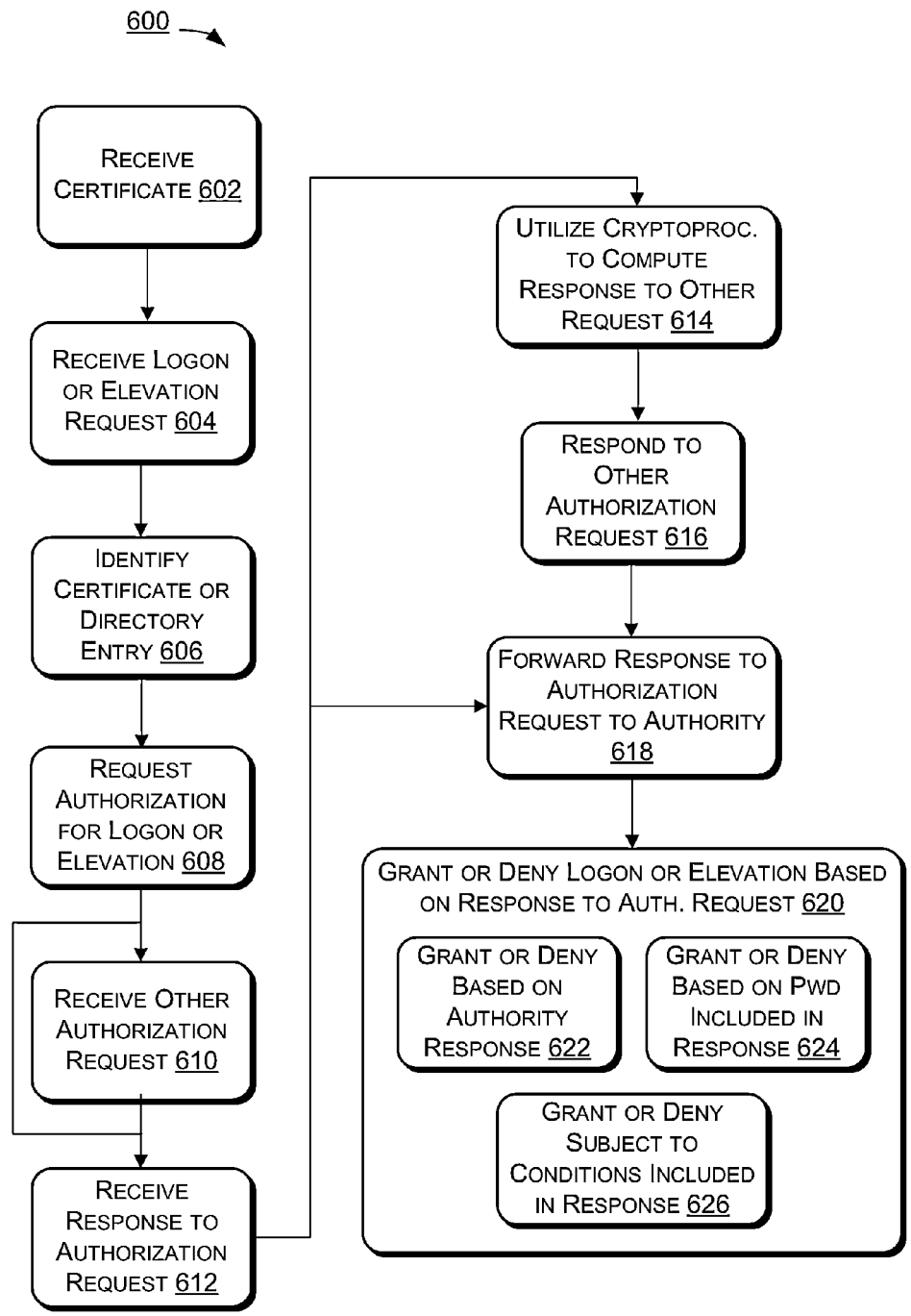
FIG. 6 illustrates an example process for requesting authorization from another device equipped with a secure cryptoprocessor for authorizing the request, receiving a response from the other device, and granting or denying the request based on the response.

FIGS. 5 and 6 illustrate example processes 500 and 600. These processes 500 and 600 are illustrated as logical flow graphs, each operation of which represents a sequence of operations that can be implemented in hardware, software, or a combination thereof. In the context of software, the operations represent computer-executable instructions stored on one or more computer storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process for utilizing a secure cryptoprocessor to compute a response to an authorization request received from another device and to provide the response to the other device. The process 500 includes, at 502, a first device broadcasting to a second device a certificate that includes a public key used in the authorization. Each of the first device and the second device is any of a personal computer, a laptop computer, a work station, a server system, a mainframe, a cellular phone, a smart phone, a tablet computer, a media center, a media device, a game console, a calculator, an e-reader, a badge reader, an appliance, a vehicle, or a wearable computing device. The first device and second device may be in proximity to each other and communicate with each other using one or more wireless connections, or may be remote from each other and communicate with each other over one or more public or private networks.

At 504, the first device receives a request for authorization from the second device. The request may, for example, be a request for authentication of an identity or a request for authorization for an action. The request may also include a photo of a person captured at the second device or a location of the second device.

At 506, the first device may initiate two-way authorization by requesting authorization from the second computing device.

At 508, the first device may display information associated with the request for authorization. At 510, the displaying may include presenting a user of the first device with one or more selectable conditions for placement on the authorization or asking the user questions, receiving answers to the questions, and placing conditions on the authorization based on the answers to the questions. At 512, the displaying may include displaying the photo included in the request for authorization. At 514, the displaying may include displaying the location included in the request for authorization. At 516, the first device receives input responsive to the display of information, such as approval of or assent to the authorization request.

At 518, the first device may then request user entry of a PIN. At 520, the requesting of the user entry of the PIN may be performed conditionally based at least in part on whether the second device is a trusted device.

At 522, the first device utilizes the secure cryptoprocessor of the first device to compute a response to the request for authorization. The secure cryptoprocessor computes the response based on protected authorization credentials for one or more devices stored by the secure cryptoprocessor. At 524, the secure cryptoprocessor communicates with one or more remote, secure cryptoprocessors and computes the response based at least on the communicating with the one or more remote, secure cryptoprocessors.

At 526, the first device provides the computed response to the second device.

At 528, the first device may continue two-way authorization by receiving a computed response to its authorization request from the second device.

At 530, when the first device has been local to the second device, the first device may leave proximity of the second device and, by leaving, may cause the authorization to expire.

FIG. 6 illustrates an example process for requesting authorization from another device equipped with a secure cryptoprocessor for authorizing the request, receiving a response from the other device, and granting or denying the request based on the response. The process 600 includes, at 602, a requesting device may receive a certificate associated with an authorizing device. The certificate may be wirelessly broadcast by the authorizing device, if the authorizing device is local.

At 604, the requesting device may receive a logon or elevation request from an application or from the platform of the requesting device.

At 606, in response to receiving the logon or elevation request, the requesting device may identify a certificate or an entry in a directory, the certificate or the entry listing one or more devices, including the authorizing device. The certificate or the entry listing one or more devices may be a prioritized list of devices and the authorizing device may be the highest priority device on the list for which a connection is available.

At 608, the requesting device may request authorization for the logon or elevation request from the authorizing device. The authorizing device has a secure cryptoprocessor configured to store protected authorization credentials for one or more devices and uses the secure cryptoprocessor to compute a response to the authorization request.

At 610, the first device may engage in two-way authorization by receiving a request for authorization from the authorizing device.

At 612, in response to requesting authorizing, the requesting device may receive the computed response from the authorizing device.

At 614, if the requesting device is also an authorizing device engaged in two-way authorization, the requesting device may utilize a secure cryptoprocessor of the requesting device to compute a response to the authorization request received from the authorizing device. At 616, the requesting device may then provide that compute response to the authorizing device.

At 618, the requesting device forwards the computed response received from the authorizing device to an authority and receive a response from the authority.

At 620, the requesting device grants or denies the logon or elevation request based at least in part on the computed response from the authorizing device. At 622, the requesting device grants or denies the logon or elevation request based further on the response from the authority. Also or instead, at 624, the requesting device grants or denies the logon or elevation request based further on a password included in the authorization response from the authorizing device. Additionally or alternatively, at 626, the requesting device grants or denies the logon or elevation request subject to conditions specified in the authorization response from the authorizing device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
   a processor;
   a secure cryptoprocessor having protected authorization credentials for one or more devices; and
   an authorization module having computer-executable instructions that when operated by the processor, cause the processor to perform operations including:
      receiving a request for elevation from a requesting device;
      displaying information associated with the request for elevation to seek approval from a user of the computing device;
      receiving input to the computing device indicating approval from the user for the request for elevation;
      in response to receiving the input indicating approval, utilizing the secure cryptoprocessor to compute a response to the request for elevation based at least in part on the protected authorization credentials; and
      providing the response to the request for elevation to the requesting device.

2. The computing device of claim 1, wherein the displaying information comprises:
   presenting the user with one or more selectable conditions for placement on the elevation; or
   asking the user questions, receiving answers to the questions, and placing conditions on the elevation based on the answers to the questions.

3. The computing device of claim 1, wherein the request includes a photo of a person captured at the requesting device and the displaying information includes displaying the photo.

4. The computing device of claim 1, wherein the request includes a location of the requesting device and the displaying information includes displaying the location.

5. A method comprising:
   receiving, by a first device, a request for elevation from a second device;
   utilizing, by the first device, a secure cryptoprocessor of the first device to compute a response to the request for elevation based on protected authorization credentials for one or more devices stored by the secure cryptoprocessor;
   providing, by the first device, the response to the second device;
   displaying information associated with the request for elevation;
   receiving input assenting to the request for elevation; and
   performing the utilizing based at least in part on the input assenting to the request for elevation.

6. The method of claim 5, further comprising requesting user entry of a personal identification number (PIN), wherein the secure cryptoprocessor computes the response based at least in part on the entry of the PIN.

7. The method of claim 6, performing the requesting of the user entry of the PIN conditionally based at least in part on whether the second device is a trusted device.

8. The method of claim 5, wherein the secure cryptoprocessor is a hardware trusted platform module (TPM).

9. The method of claim 5, wherein the utilizing the secure cryptoprocessor comprises the secure cryptoprocessor communicating with one or more remote, secure cryptoprocessors and computing the response based at least on the communicating with the one or more remote, secure cryptoprocessors.

10. The method of claim 5, wherein the first device and the second device are in proximity to each other and communicate with each other using one or more wireless connections.

11. The method of claim 10, wherein the authorization expires when first device and the second device are no longer in proximity to each other.

12. The method of claim 5, wherein the first device is remote from second device and the first device and the second device communicate with each other over one or more public or private networks.

13. The method of claim 5, further comprising broadcasting to second device, by the first device, a certificate that includes a public key used in the authorization.

14. The method of claim 5, wherein the first device or the second device is any of a personal computer, a laptop computer, a work station, a server system, a mainframe, a cellular phone, a smart phone, a tablet computer, a media center, a media device, a game console, a calculator, an e-reader, a badge reader, an appliance, a vehicle, or a wearable computing device.

15. The method of claim 5, wherein the request for elevation is a request for authentication of an identity or a request for elevation for an action.

16. One or more tangible computer storage media having stored thereon a plurality of programming instructions configured to program a computing device to perform operations comprising:
- receiving an elevation request at the computing device;
- requesting authorization from another device for the elevation request by at least providing information associated with the request for elevation to the other device, the other device having a secure cryptoprocessor configured to store protected authorization credentials for one or more devices and to utilize the cryptoprocessor based at least in part on input that is received at the other device assenting to the request for elevation;
- receiving a response from the other device; and
- granting the elevation request based on the response from the other device.

17. The one or more tangible computer storage media of claim 16, wherein the operations further comprise identifying a certificate or an entry in a directory in response to receiving the elevation request, the certificate or the entry designating one or more devices, including the other device.

18. The one or more tangible computer storage media of claim 17, wherein the certificate or the entry designating one or more devices is a prioritized list of devices and the other device is the highest priority device on the list for which a connection is available.

19. The one or more tangible computer storage media of claim 16, wherein the operations further comprise forwarding the response to an authority and performing the granting based at least in part on a response from the authority.

20. The one or more tangible computer storage media of claim 16, wherein the response includes a password and the granting is based at least in part on the password.

21. The one or more tangible computer storage media of claim 16, wherein the response includes one or more conditions placed on the authorization.

22. The one or more tangible computer storage media of claim 16, wherein the operations further comprise:
- receiving a request for authorization from the other device;
- utilizing a secure cryptoprocessor of the computing device to compute a response to the request for authorization from the other device based on protected authorization credentials for one or more devices stored by the secure cryptoprocessor of the computing device; and
- providing the response to the other device.

* * * * *